United States Patent
Jiang et al.

(10) Patent No.: US 6,897,862 B2
(45) Date of Patent: May 24, 2005

(54) METHOD AND SYSTEM FOR APPLYING CONSTRAINTS TO CHAINS OF CURVES

(75) Inventors: Yu Jiang, Mason, OH (US); Hongliu Zou, Mason, OH (US); Sangeeta Gupta, Cincinnati, OH (US); Jack C. H. Chung, Cincinnati, OH (US)

(73) Assignee: UGS Corp., Plano, TX (US)

(*) Notice: Subject to any disclaimer, the term of this patent is extended or adjusted under 35 U.S.C. 154(b) by 252 days.

(21) Appl. No.: 10/079,773

(22) Filed: Feb. 19, 2002

(65) Prior Publication Data

US 2003/0156110 A1 Aug. 21, 2003

(51) Int. Cl.[7] .............................................. G06T 17/00
(52) U.S. Cl. ...................... 345/420; 345/420; 345/652; 345/663; 345/629; 345/678; 345/442
(58) Field of Search ................................ 345/420, 629, 345/652, 661, 663, 429, 522, 441, 442, 672, 664, 678, 679

(56) References Cited

U.S. PATENT DOCUMENTS

| | | | |
|---|---|---|---|
| 5,615,321 A | 3/1997 | Corn | 395/133 |
| 5,990,897 A | * 11/1999 | Hanratty | 345/420 |
| 6,081,268 A | 6/2000 | Heydon et al. | 345/418 |

FOREIGN PATENT DOCUMENTS

| | | | |
|---|---|---|---|
| EP | 0 697 679 A2 | 4/1995 | G06T/17/00 |

OTHER PUBLICATIONS

Elsevier Service Ltd., "Constraint-based parametric conics for CAD," Computer–Aided Design, vol. 28, No. 2, pp. 91–100, 1996.

F. Arbab and B. Wang, "A Geometric Constraint Management System in Oar," Computer Science Department, pp. 205–231, 1991.

Chung, Jack C. H., et al., "Framework for integrated mechanical design automation", Computer–Aided Design 32 pp. 355–365, © 2000 Elsevier Science Ltd. All Rights Reserved.

Chung, Jack C.H., et al., "Technical Evaluation of Variational and Parametric Design", Proceedings of the ASME International Computers in Engineering Conference, 1990 (See Reference No. 19 cited in the above Document "I").

Chung, Jack C.H., et al., Extended Variational Design Technology—Foundation for Integrated Design Automation, pp. 13–22, Fifth Symposium on Solid Modeling, Ann Arbor, MI © ACM 1999.

* cited by examiner

Primary Examiner—Kimbinh T. Nguyen
(74) Attorney, Agent, or Firm—Baker Botts L.L.P.

(57) ABSTRACT

A method and system for applying constraints to a wireframe chain of curves for Computer-Aided Design (CAD) is disclosed, whereby a geometric constraint network can be expanded to include chains of curves as types of wireframe entities. As such, a chain of curves can be represented as one composite curve. As a result, a constraint solver can generate and/or maintain any constraint on a chain of curves, which enables the constraints to be solved while moving along the curves independently from the chain's geometry and topology changes.

44 Claims, 4 Drawing Sheets

METHOD AND SYSTEM FOR APPLYING CONSTRAINTS TO CHAINS OF CURVES

TECHNICAL FIELD OF THE INVENTION

The present invention relates in general to Computer-Aided Design (CAD) and, in particular, but not exclusively, to a method and system for applying constraints to chains of curves for computer-implemented drawing applications.

BACKGROUND OF THE INVENTION

In certain computer-aided design and two- or three-dimensional graphics applications, the images produced are often built on a skeleton structure referred to as a "wireframe". In CAD applications, graphics or product designers often prefer to use wireframe images because they can be rendered and manipulated on screens more readily than other types of images. FIGS. 1A and 1B illustrate two-dimensional images of a design in wireframe form.

The ultimate shape of a wireframe is determined by a set of constraints and dimensions applied to individual lines and curves to form a composite design. For example, parallel lines, perpendicular lines, circles, arcs, and lines coincident or tangent to circles can be geometric constraints for a wireframe design. Dimensions for a wireframe design can be values representing the distance between two parallel lines (e.g., linear dimension), the angle between two convergent lines (e.g., angular dimension), or the radius of a circle (e.g., radial dimension).

Existing geometric constraints for wireframe designs are limited in that they can be applied only to single geometric entities, and therefore, are sensitive to topology changes of the underlying design. For example, in the free-form surface design field, a user may desire to form a section of a two-dimensional wireframe structure by defining a curve tangent to a tangent continuous set of curves (or a curve perpendicular to a tangent continuous set of curves). However, given the existing state of the art in wireframe design, it is not possible to define a curve that is tangent (or perpendicular) to a tangent continuous chain of curves independently of the chain of curves' topology. As a result, if a geometric entity in an existing wireframe design is changed, then during a replay of the design to implement the change, the intent of the design change may not be maintained if the topology of the associated chain of curves is changed. Accordingly, a pressing need exists for a wireframe design approach that can maintain the design intent if a geometric entity is changed regardless of whether or not the topology of the associated chain of curves is changed.

SUMMARY OF THE INVENTION

According to the present invention, problems and disadvantages associated with previous techniques for applying constraints to wireframe designs may be reduced or eliminated.

According to one example embodiment of the present invention, a network of geometric constraints can be expanded to include a chain of curves as a type of wireframe entity. As such, a chain of curves can be represented as one composite curve. Consequently, the present invention enables a constraint solver to maintain any constraint applied to a chain of curves, and to solve constraints while moving across the curves but independently from the chain's geometry and topology changes.

Certain embodiments of the present invention may provide one or more technical advantages over previous techniques. For example, the present invention significantly improves the robustness of parts modifications and replay processes, and dramatically reduces the rate of replay failures. As such, the present invention provides the functionality needed to capture design intent and enables users to maintain constraints and dimensions on a wireframe path or section such as, for example, a chain of curves. Other technical advantages of the present invention will be readily apparent to one skilled in the art from the figures, description and claims included herein.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

The preferred embodiment of the present invention and its advantages are best understood by referring to FIGS. 1A–6 of the drawings, like numerals being used for like and corresponding parts of the various drawings.

Essentially, in accordance with the present invention, the geometric constraint network can be expanded to include chains of curves as types of wireframe entities. As such, a chain of curves can be represented as one composite curve. As a result, a constraint solver can maintain any constraint on a chain of curves, which enables the solver to solve constraints while moving along the curves independently from the chain's geometry and topology changes.

Figure 1A:
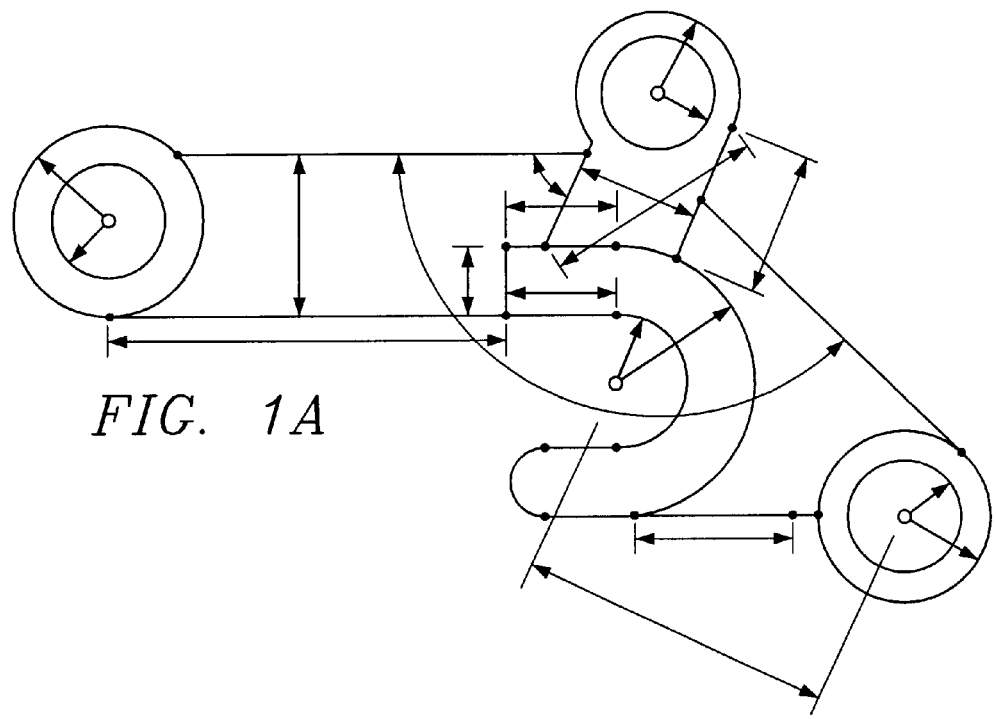
FIGS. 1A and 1B illustrate two-dimensional images of a design in wireframe form.
Figure 1B:
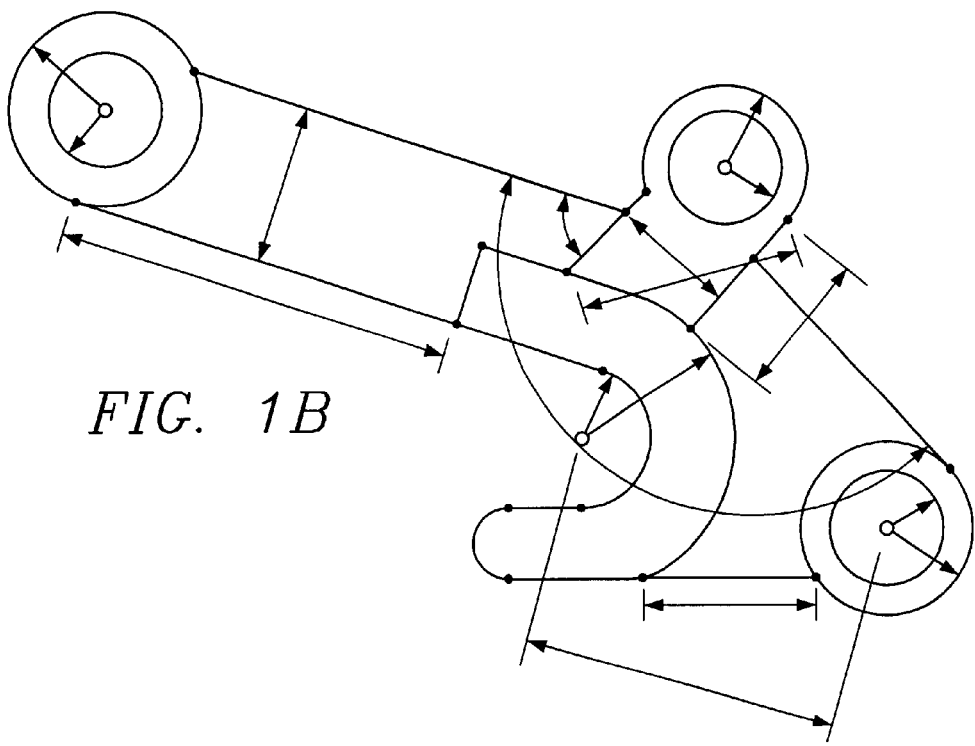
Figure 2:
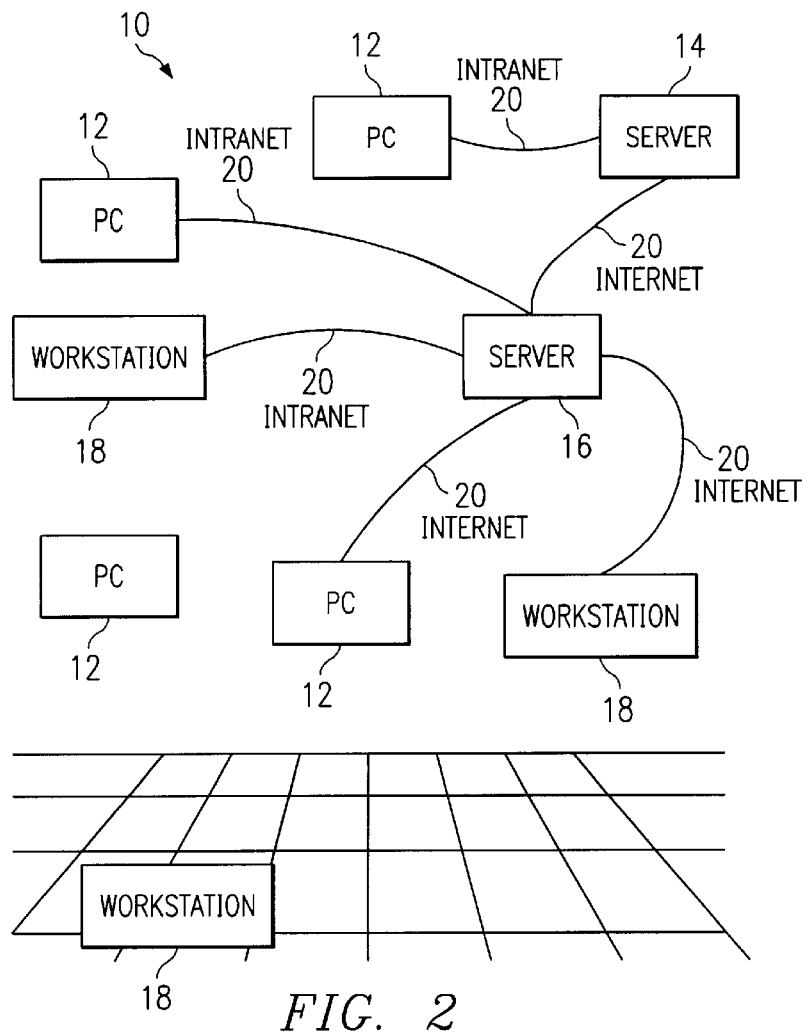
FIG. 2 illustrates an example system, which can be used to implement one example embodiment of the present invention.

FIG. 2 illustrates an example system 10, which can be used to implement one example embodiment of the present invention. System 10 can include one or more personal computers (PCs) 12, work stations 18, or similar computer systems at one or more locations. Each PC 12, work station 18, or similar computer system can include one or more input devices, such as a mouse, touch screen, or other suitable device to receive user input. Also, each PC 12, work station 18, or similar computer system can include one or more output devices to convey information associated with operation of system 10, such as visual information that may be displayed by a Graphical User Interface (GUI). For example, such input and output devices may be used with a suitable software application for designing and displaying a wireframe structure.

Some or all of the PCs 12 and work stations 18 can be coupled to one another and/or a suitable server 14 or 16 using links 20. Also, one or more PCs 12 or work stations 18 may be operated in a standalone mode. For example, links 20 can include one or more local area networks (LANs), metropolitan area networks (MANs), wide area networks (WANs), a portion of a global network such as the Internet, or any other suitable wireline, optical, wireless, or other type of link.

Figure 4:
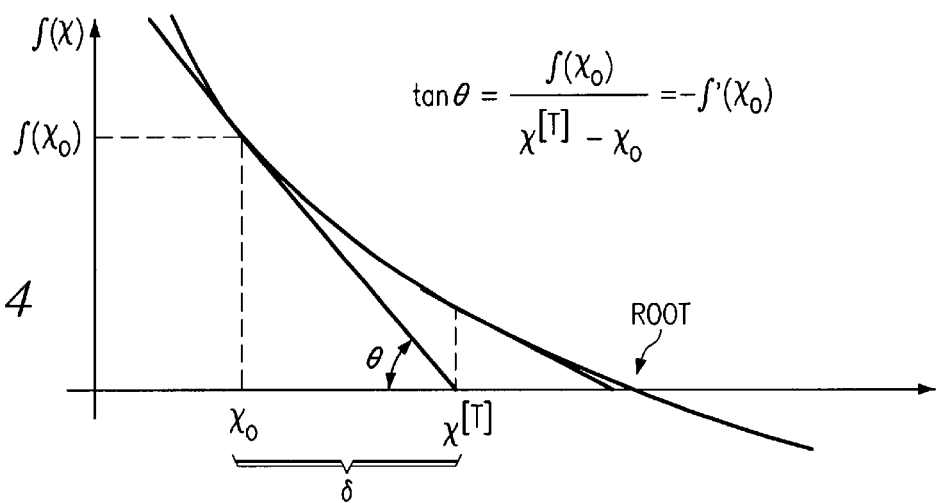
FIG. 4 illustrates an example computer-implemented Newton-Raphson method, which may be used to implement a solver for creating or maintaining a geometric constraint, in accordance with one example embodiment of the present invention.
Figure 3:
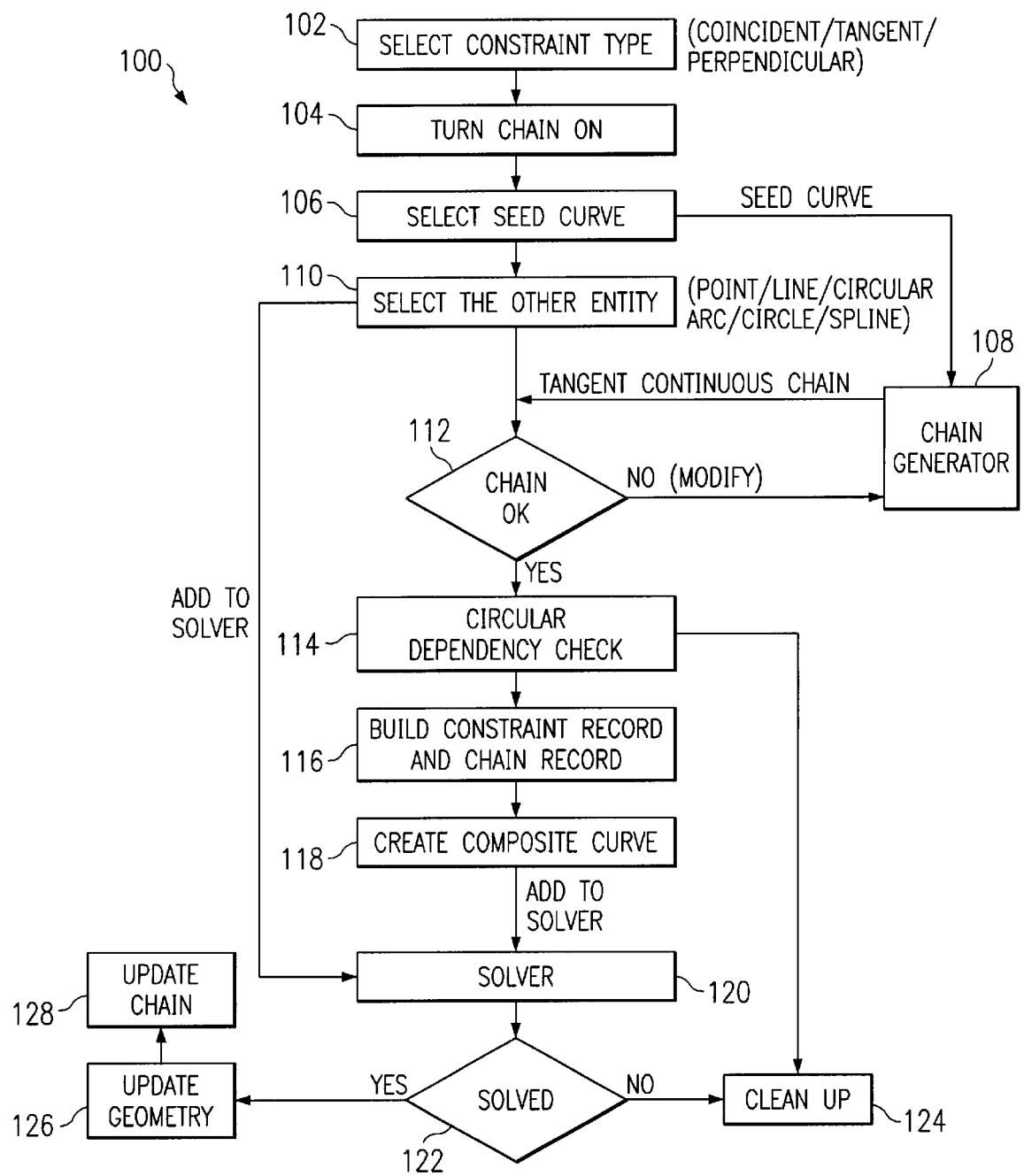
FIG. 3 illustrates an example method, which can be used to implement one example embodiment of the present invention.
Figure 5:
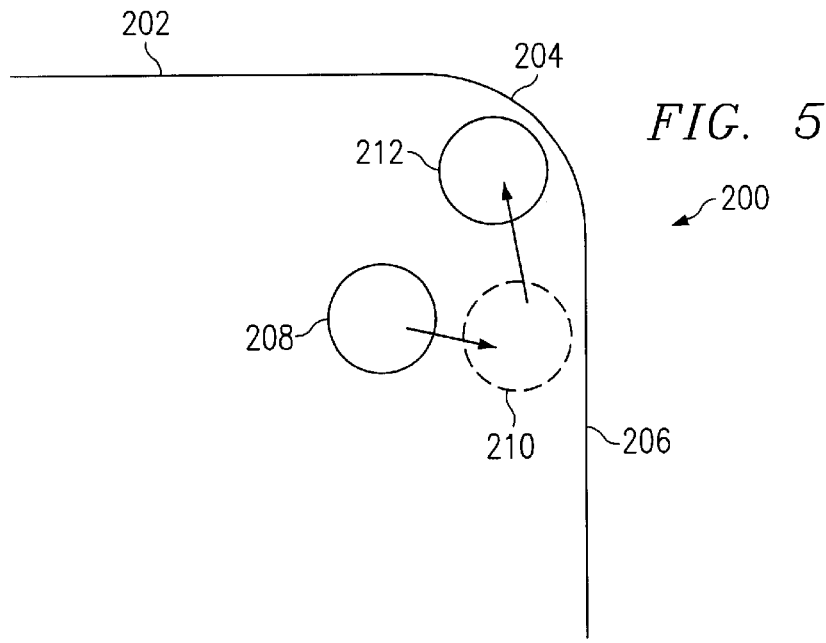
FIG. 5 represents an example display, which can help illustrate the method shown in FIG. 3.

FIG. 3 illustrates an example method 100, which can be used to implement one example embodiment of the present invention. For example, method 100 may be implemented in software executed by a PC 12 or workstation 18 to create a constraint (e.g., tangent, coincident, perpendicular) that can be applied to a continuous chain of curves. FIG. 4 represents an example display 200, which can help illustrate the method 100 shown in FIG. 3. At step 102, a user can select the type of geometric constraint to be used. For example, the user can select a tangent constraint to be used. At step 104, the user can indicate a desire to apply the selected constraint to a chain of curves. At step 106, the user can select a seed curve (e.g., to indicate the type of chain of interest). For example, the user can select the curve 202 in FIG. 5 as a seed curve or starting curve for a continuous chain of curves made up of three arcs 202, 204 and 206 connected together and each one tangent to another. At step 108, a chain generator (e.g., computer-implemented tool for generating a curve) selects a suitable curve based on the selected seed curve. The chain generator can select the curve to generate using certain predetermined criteria, such as, for example, criteria defining a tangent continuous chain of curves (e.g., tangent continuous chain composed of arcs 202, 204, 206). At step 110, the user can select a second geometric entity to be constrained. For example, the user can select a circle 208 as a second geometric entity to be constrained. In addition to circle 208, other example geometric entities that can be constrained include a point, line, circular arc, or spline. At step 112, the user can review the chain of curves generated by the chain generator. If the user is not satisfied with the chain thus generated, the user can modify the criteria used for generating the chain. In response, at step 108, the chain generator can generate a new chain of curves based on the modified criteria. If, at step 112, the user is satisfied with the generated chain of curves, at step 114, the software would perform a circular dependency check (e.g., circular reasoning) to determine if the constraint can be applied on the chain of curves. At step 116, the PC 12 or workstation 18 involved can store the current constraint data and chain of curves data in local memory. At step 118, the PC 12 or workstation 18 can create a composite curve, by converting the chain data (e.g., tangent continuous chain of curves created at step 108) into a mathematical representation of that curve. At step 120, the composite curve and other entity selected (step 110) can be input to a solver (e.g., numerical solver or algebraic solver implemented in software) to solve suitable equations in order to maintain the selected constraint (e.g., tangent) for the other entity selected (e.g., circle 208) and the continuous chain of curves. For example, at step 120, the solver can solve suitable equations to maintain circle 210 tangent to curve 206. In order to maintain the selected constraint with respect to the entity selected and the chain of curves, the solver can be implemented using a Newton-Raphson method or Modified Gram-Schmidt method to solve the numerical and/or algebraic equations involved. FIG. 4 illustrates an example computer-implemented Newton-Raphson method, which may be used to implement a solver for creating or maintaining a geometric constraint, in accordance with one example embodiment of the present invention. For example, the method illustrated in FIG. 4 may be implemented in software and used for creating or maintaining a tangent constraint to a tangent chain of curves. Referring to FIG. 4, the software may perform a Taylor Series Expansion of f(x) about $x_0$ as follows: $f(x)=f(x_0)+(x-x_0)f'(x_0)+0.5(x-x_0)^2f''(x_0)+...$ Therefore, $f(x)=0=f(x_0)+(x-x_0)f'(x_0)$. In iterative form, $x^{(n+1)}=x^{(n)}-f(x^{(n)})/f'(f(x^{(n)}))$. In matrix form, $J\{X^{(n+1)}-X^{(n)}\}=-F(X^{(n)})$.

At step 122, the software can use predetermined criteria to determine whether the solution to maintain the selected constraint with respect to the selected entity and chain of curves are within acceptable tolerances. If not, at step 124, the software can delete the current records including the selected constraint and chain of curves. If the solutions from step 122 are within acceptable tolerances, at step 126, the geometric relations for maintaining the selected constraint (e.g., tangent), selected entity (e.g., circle), and the chain of curves (e.g., tangent continuous chain of curves), the data associated with the current locations of the circle tangent to the tangent continuous chain of curves can be updated and stored in local memory. For example, the selected constraint can be maintained while the selected entity is moved (e.g., by dragging with a mouse) to another location on the continuous chain of curves. As such, if circle 210 is moved from arc 206 to arc 204, the resulting circle 212 can maintain the tangent relationship with the tangent chain of curves at arc 204. At step 128, the updated geometric relationship between the selected entity, the selected type of constraint, and the generated chain of curves can be displayed to a user (e.g., via a GUI).

Figure 6:
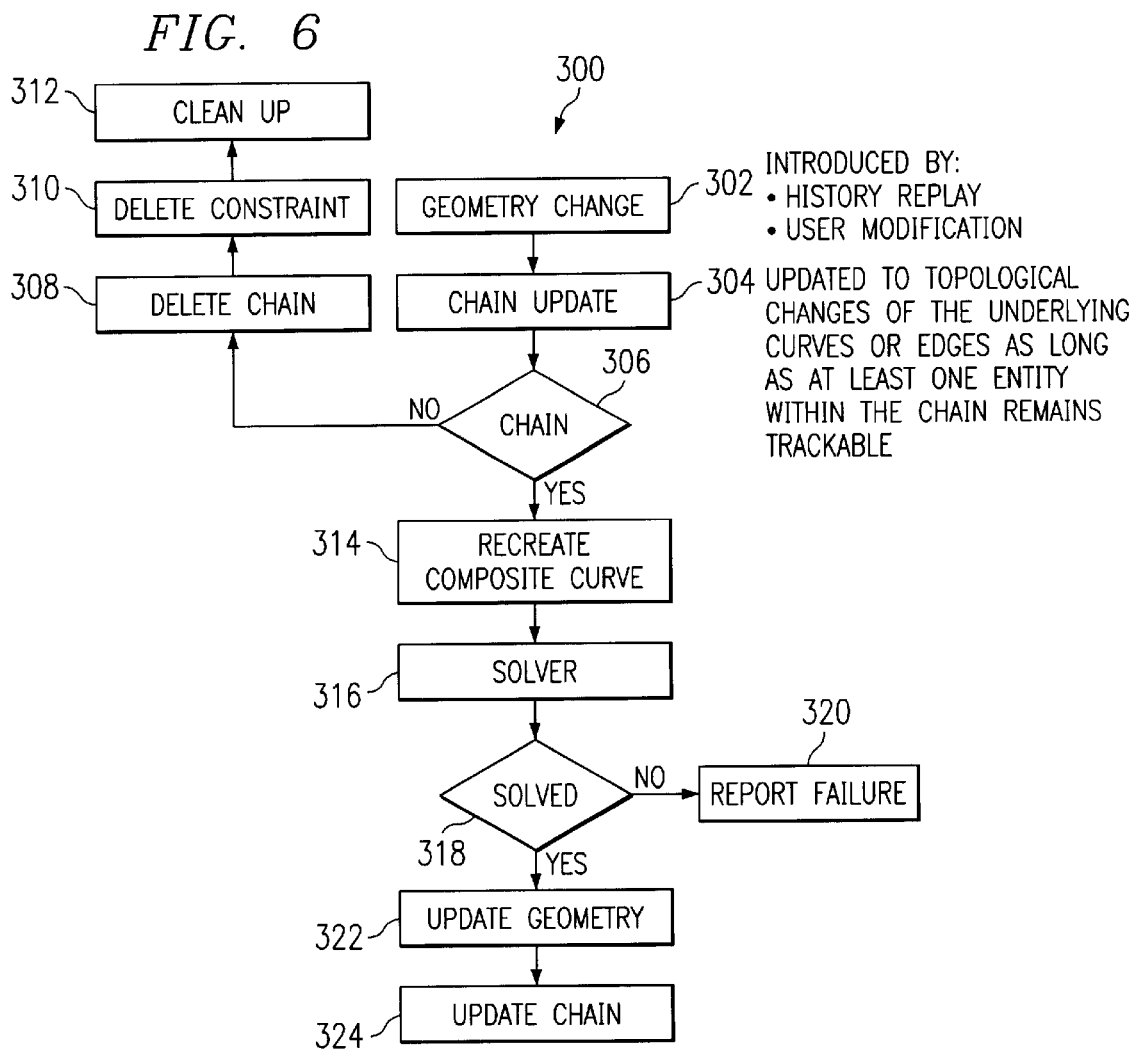
FIG. 6 illustrates an example method, which can be used to implement a second example embodiment of the present invention.

FIG. 6 illustrates an example method 300, which can be used to implement a second example embodiment of the present invention. For example, method 300 may be implemented in software executed by a PC 12 or workstation 18 to maintain a constraint (e.g., tangent, coincident, perpendicular) that has been applied to a continuous chain of curves. At step 302, a change in the underlying geometry for an existing chain of curves may be introduced. The geometry change may be introduced, for example, by a user modifying a geometric entity with respect to an existing chain of curves, or by a computer-implemented history replay procedure (e.g., step-by-step replay of user actions) whereby a geometric entity may be changed. At step 304, the software (e.g., executed by a PC 12 or workstation 18) updates the existing chain of curves (i.e., re-creates the chain of curves given the topological changes of the underlying curves or edges, based on the geometry change or changes of step 302). At step 306, the software can use predetermined criteria to determine whether the solution to maintain the selected constraint with respect to the selected entity and chain of curves are within acceptable tolerances. If not, at steps 308 and 310, the software can delete the current records including the selected constraint and chain of curves. At step 312, any remaining procedures necessary to terminate the chain update may be performed.

Otherwise, at step 314, if the solutions from step 306 are within acceptable tolerances, the PC 12 or workstation 18 can re-create a composite curve, by converting the chain data (e.g., tangent continuous chain of curves) into a mathematical representation of that curve. At step 316, the re-created composite curve can be input to a solver (e.g., numerical solver or algebraic solver implemented in software) to solve suitable equations in order to maintain the selected constraint (e.g., tangent) for any new geometry selected (e.g., at step 302) and the continuous chain of curves. The solver can be implemented using a Newton-Raphson method or Modified Gram-Schmidt method to solve the numerical and/or algebraic equations involved. At step 318, the software can use predetermined criteria to determine whether the solution to maintain the selected constraint with respect to the selected entity and chain of curves are within acceptable tolerances. If not, at step 320, the software can report to the system and/or user that the new solution has failed. However, if the solutions from step 318 are within acceptable tolerances, at step 322, the geometric relations for maintaining the selected constraint (e.g., tangent), selected entity (e.g., circle), and the chain of curves (e.g., tangent continuous chain of curves), the data associated with the current locations of the circle tangent to the tangent continuous chain of curves can be updated and stored in local memory. At step 324, the updated geometric relationship between the selected entity, the selected type of constraint, and the generated chain of curves can be displayed to a user (e.g., via a GUI).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method comprising:

generating a chain of curves;

selecting a geometric entity to be constrained with the chain of curves;

selecting a constraint specifying a relationship between the geometric entity and the chain of curves;

generating data defining a first drawing that includes the chain of curves and the geometric entity, the constraint specifying a relationship between the chain of curves and the geometric entity;

modifying a portion of the data defining the first drawing to create data defining a portion of a second drawing;

in response to the modification, automatically modifying another portion of the data defining the first drawing to result in data defining a second drawing that maintains the constraint between the chain of curves and the geometric entity; and wherein the data defining the first and second drawings defines first and second drawings in which the geometric entity coincides with the chain of curves at respective first and second points, the first and second points being different points on the chain of curves.

2. The method of claim 1, wherein said geometric constraint comprises a tangent geometric constraint.

3. The method of claim 1, wherein said geometric constraint comprises a coincident geometric constraint.

4. The method of claim 1, wherein said geometric constraint comprises a perpendicular geometric constraint.

5. The method of claim 1, wherein said second geometric entity comprises a circle.

6. The method of claim 1, wherein said second geometric entity comprises a circular arc.

7. The method of claim 1, wherein said second geometric entity comprises a point.

8. The method of claim 1, wherein said second geometric entity comprises a line.

9. The method of claim 1, wherein said second geometric entity comprises a spline.

10. The method of claim 1, wherein said generated chain of curves comprises a continuous chain of curves.

11. The method of claim 1, wherein said generated chain of curves comprises a tangent continuous chain of curves.

12. The method of claim 1, wherein the step of applying said geometric constraint to said second geometric entity and said composite curve comprises constraint solving using a Newton-Raphson method.

13. The method of claim 1, wherein the step of applying said geometric constraint to said second geometric entity and said composite curve comprises constraint solving using a Modified Gram-Schmidt method.

14. The method of claim 1, wherein the step of applying said geometric constraint to said second geometric entity and said composite curve comprises constraint solving using a computer-implemented numerical method.

15. The method of claim 1, further comprising the steps of:

selecting a seed curve associated with said chain of curves; and generating said chain of curves from said seed curve.

16. The system of claim 1, wherein modifying a portion of data defining the first drawing comprises modifying data defining a location of the chain of curves in the first drawing.

17. The system of claim 1, wherein modifying a portion of data defining the first drawing comprises modifying data defining a location of the geometric entity in the first drawing.

18. The method of claim 1, wherein modifying a portion of data defining the first drawing comprises modifying data defining an orientation of the chain of curves in the first drawing.

19. The method of claim 1, wherein modifying a portion of data defining the first drawing comprises modifying data defining an orientation of the geometric entity in the first drawing.

20. A system for applying a geometric constraint to a chain of curves, comprising:

a processing unit;

a user interface, said user interface coupled to said processing unit; and a display, said display coupled to said processing unit and said user interface, said processing unit operable to:

generate a chain of curves;

select a geometric entity to be constrained with the chain of curves;

select a constraint specifying a relationship between the geometric entity and the chain of curves;

generate data defining a first drawing that includes the chain of curves and the geometric entity, the constraint specifying a relationship between the chain of curves and the geometric entity;

modify a portion of the data defining the first drawing to create data defining a portion of a second drawing;

in response to the modification, automatically modify another portion of the data defining the first drawing to result in data defining a second drawing that maintains the constraint between the chain of curves and the geometric entity; and wherein the data defining the first and second drawings defines first and second drawings in which the geometric entity coincides with the chain of curves at respective first and second points, the first and second points being different points on the chain of curves.

21. The system of claim 20, wherein said geometric constraint comprises a tangent geometric constraint.

22. The system of claim 20, wherein said geometric constraint comprises a coincident geometric constraint.

23. The system of claim 20, wherein said geometric constraint comprises a perpendicular geometric constraint.

24. The system of claim 20, wherein said second geometric entity comprises a circle.

25. The system of claim 20 wherein said second geometric entity comprises a circular arc.

26. The system of claim 20, wherein said second geometric entity comprises a point.

27. The system of claim 20, wherein said second geometric entity comprises a line.

28. The system of claim 20, wherein said second geometric entity comprises a spline.

29. The system of claim 20, wherein said generated chain of curves comprises a continuous chain of curves.

30. The system of claim 20, wherein said generated chain of curves comprises a tangent continuous chain of curves.

31. The system of claim 20, wherein said processing unit is further operable to:

apply said geometric constraint to said second geometric entity and said composite curve using a Newton-Raphson method.

32. The system of claim 20, wherein said processing unit is further operable to:

apply said geometric constraint to said second geometric entity and said composite curve using a Modified Gram-Schmidt method.

33. The system of claim 20, wherein said processing unit is further operable to:

apply said geometric constraint to said second geometric entity and said composite curve using a computer-implemented numerical method.

34. The system of claim 20, wherein said processing unit is further operable to:

select a seed curve associated with said chain of curves; and generate said chain of curves from said seed curve.

35. The system of claim 20, wherein modifying a portion of data defining the first drawing comprises modifying data defining a location of the chain of curves in the first drawing.

36. The system of claim 20, wherein modifying a portion of data defining the first drawing comprises modifying data defining a location of the geometric entity in the first drawing.

37. The method of claim 20, wherein modifying a portion of data defining the first drawing comprises modifying data defining an orientation of the chain of curves in the first drawing.

38. The method of claim 20, wherein modifying a portion of data defining the first drawing comprises modifying data defining an orientation of the geometric entity in the first drawing.

39. Software for applying a geometric constraint to a chain of curves, the software being embodied in computer-readable media and when executed operable to:

generate a chain of curves;

select a geometric entity to be constrained with the chain of curves;

select a constraint specifying a relationship between the geometric entity and the chain of curves;

generate data defining a first drawing that includes the chain of curves and the geometric entity, the constraint specifying a relationship between the chain of curves and the geometric entity defined by the constraint;

modify a portion of the data defining the first drawing to create data defining a portion of a second drawing;

in response to the modification, automatically modify another portion of the data defining the first drawing to result in data defining a second drawing that maintains the constraint between the chain of curves and the geometric entity; and wherein the data defining the first and second drawings defines first and second drawings in which the geometric entity coincides with the chain of curves at respective first and second points, the first and second points being different points on the chain of curves.

40. A system for applying a geometric constraint to a chain of curves, comprising:

means for generating a chain of curves;

means for selecting a geometric entity to be constrained with the chain of curves;

means for selecting a constraint specifying a relationship between the geometric entity and the chain of curves;

means for generating data defining a first drawing that includes the chain of curves and the geometric entity, the constraint specifying a relationship between the chain of curves and the geometric entity;

means for modifying a portion of the data defining the first drawing to create data defining a portion of a second drawing;

means in response to the modification, automatically modifying another portion of the data defining the first drawing to result in data defining a second drawing that maintains the constraint between the chain of curves and the geometric entity; and wherein the data defining the first and second drawings defines first and second drawings in which the geometric entity coincides with the chain of curves at respective first and second points, the first and second points being different points on the chain of curves.

41. The system of claim 39, wherein modifying a portion of data defining the first drawing comprises modifying data defining a location of the chain of curves in the first drawing.

42. The system of claim 39, wherein modifying a portion of data defining the first drawing comprises modifying data defining a location of the geometric entity in the first drawing.

43. The system of claim 39, wherein modifying a portion of data defining the first drawing comprises modifying data defining an orientation of the chain of curves in the first drawing.

44. The system of claim 39, wherein modifying a portion of data defining the first drawing comprises modifying data defining an orientation of the geometric entity in the first drawing.

* * * * *